(12) United States Patent
Peltonen et al.

(10) Patent No.: US 8,597,422 B2
(45) Date of Patent: Dec. 3, 2013

(54) PIGMENT AND FILLER AND A METHOD OF MANUFACTURING IT

(75) Inventors: Soili Peltonen, Rajamäki (FI); Hannu Mikkonen, Rajamäki (FI); Pia Qvintus-Leino, Espoo (FI); Petri Varjos, Helsinki (FI); Kirsi Kataja, Helsinki (FI)

(73) Assignee: Valtion Teknillinen Tutkimuskeskus, VTT (FI)

( * ) Notice: Subject to any disclaimer, the term of this patent is extended or adjusted under 35 U.S.C. 154(b) by 989 days.

(21) Appl. No.: 10/573,041

(22) PCT Filed: Oct. 1, 2004

(86) PCT No.: PCT/FI2004/000575
§ 371 (c)(1),
(2), (4) Date: Dec. 22, 2006

(87) PCT Pub. No.: WO2005/030844
PCT Pub. Date: Apr. 7, 2005

(65) Prior Publication Data
US 2007/0101904 A1    May 10, 2007

(30) Foreign Application Priority Data

Oct. 2, 2003    (FI) .................................... 20035173
May 31, 2004  (FI) .................................... 20040741

(51) Int. Cl.
*C08L 3/00*     (2006.01)
*C09D 103/00*   (2006.01)
*C09J 103/00*   (2006.01)

(52) U.S. Cl.
USPC ............... 106/206.1; 106/162.1; 106/162.81; 106/207.1; 106/493; 106/499

(58) Field of Classification Search
USPC ............ 428/402; 536/112, 123.12, 124, 127, 536/55.1; 106/162.1, 162.81, 206.1, 207.1, 106/493, 499, 501.1

IPC ............ C08L 3/00; C09D 103/00; C09J 103/00
See application file for complete search history.

(56) References Cited

U.S. PATENT DOCUMENTS

| | | | | | |
|---|---|---|---|---|---|
| 4,011,392 | A | * | 3/1977 | Rudolph et al. | ............... 536/108 |
| 4,716,186 | A | * | 12/1987 | Portnoy et al. | .................. 524/50 |
| 5,693,279 | A | * | 12/1997 | Feuer et al. | ................... 264/204 |
| 6,369,215 | B1 | | 4/2002 | Peltonen et al. | |

(Continued)

FOREIGN PATENT DOCUMENTS

| | | |
|---|---|---|
| EP | 0784119 A1 | 7/1997 |
| EP | 1254939 A1 | 11/2002 |

(Continued)

OTHER PUBLICATIONS

Wolff et al., The acylation of Corn Starch, Amylose and Amylopectin, J. Amer. Chem. Soc., vol. 73, pp. 346-349, (1952).

(Continued)

*Primary Examiner* — Basia Ridley
*Assistant Examiner* — Heng Chan
(74) *Attorney, Agent, or Firm* — Birch, Stewart, Kolasch & Birch, LLP

(57) ABSTRACT

The present invention relates to a light, biodegradable, organic pigment and filler, and a method of manufacturing it. According to the present invention, a solution comprising a starch derivative is first prepared by dissolving the starch derivative into a suitable solvent, and, after that, the solution is brought into contact with a non-solvent to precipitate the starch derivative from the solvent, and, as a result, a dispersion is obtained, one which comprises a precipitate consisting of starch derivative and a liquid phase formed of the solvent and the non-solvent, after which the solvent is removed from the liquid phase and the precipitate is separated from the non-solvent and recovered. The present invention can be used to manufacture both a product comprising 100-300 nm spherical particles, which is suitable for use as a pigment, and a coral-like, porous product which is particularly suitable as a filler.

21 Claims, 10 Drawing Sheets

(56) References Cited

U.S. PATENT DOCUMENTS

| | | |
|---|---|---|
| 6,562,459 B1 | 5/2003 | Bengs et al. |
| 6,582,509 B2 | 6/2003 | Malkki et al. |
| 6,605,715 B1 | 8/2003 | Lammers et al. |
| 6,617,449 B2 * | 9/2003 | Tanaka .......................... 536/123 |

FOREIGN PATENT DOCUMENTS

| | | |
|---|---|---|
| WO | WO-00/35958 A1 | 6/2000 |
| WO | WO-00/69916 A1 | 11/2000 |
| WO | WO-03/068823 A1 | 8/2003 |

OTHER PUBLICATIONS

Gros et al., Properties of Fatty Acid Esters of Amylose, J. Amer. Oil Chemists' Soc., vol. 39, pp. 19-24, (1962).

Papermaking Science and Technology, Book Part 11, p. 65, (1998).

* cited by examiner

PIGMENT AND FILLER AND A METHOD OF MANUFACTURING IT

The present invention relates to a method of manufacturing a starch based pigment or filler, according to the preamble of claim 1.

The present invention also relates to pigments or fillers, according to the preamble of claims 22 and 25, respectively.

The printing paper qualities and coated cardboards used today comprise considerable amounts of inorganic minerals, either as fillers or as coating pigments. These cause problems in the recycling of fibre, in the burning of paper and in composting. The minerals also increase the weight of the paper product considerably, which is very significant in the production of for example printable packing materials.

Synthetic organic pigments are known, too. Usually, they have good optical properties, which are based on their ability to scatter visible light. This ability is either the result of small particle size (preferably ½ of the wavelength of visible light), or of the fact that the particles have been made hollow in the manufacturing process. In general, it can be specified that particles of less than 1000 nm are suitable as coating pigments, whereas particles between 1000 and 5000 nm are suitable as fillers. The optical properties of a pigment depend not only on the particle size, but also on the particle shape. Wave optical particles, the ideal shape of which is spherical, scatter light in the most efficient way and, consequently, give the coated paper a high brightness and opacity. However, a drawback of known synthetic pigments is that alone they are not suitable as coating pigments for paper, but generally they are used as mixed in mineral pigments.

The purpose of the present invention is to generate a light, biodegradable organic pigment and filler, which can be used, for example, in the manufacturing of a printable white paper product.

In patent literature, it is known that small-sized starch granules are used as fillers or coatings for paper, either as such or chemically modified. Attempts have been made to improve their optical properties by forming cavities in them. However, the use of starch as coating pigment is limited by the fact that even the smallest starch granules available in nature are bigger than 1 micron and, consequently, they cannot be used as coating pigments for printing paper requiring a smooth quality finish.

The preparation of starch particles is described in the following patent specifications:

U.S. Pat. No. 6,582,509 presents a method in which an organic pigment is prepared by swelling starch granules to increase their volume (2-4 times the original) and plasticity, yet such that the granular structure is preserved. The swelling takes place in water, below the gelatinizing temperature. The volume and the shape stability of the granules are increased by cross-linking. Their surface can be made hydrophobic, too. Gas bubbles or cavities which have a light scattering property are formed inside the granules. The bubbles are generated by evaporating water or a solvent, or by releasing absorbed gas, or by using solvents to displace absorbed water. The dimensions of the cavities in the swelled and stabilized granules are 0.1-5 µm.

Known pigments have the same granule shape as does starch, which does not give the products a good light scattering ability.

The EP application publication 1254939 describes a method of producing biopolymer-based nanoparticles by extruding a plasticized biopolymer, such as starch, in the presence of a crosslinking chemical. The glue is prepared by reactive extrusion from starch, glycerol and glyoxal in the presence of water, and the result is a dispersion in water. The sizes of the nanoparticles are <1000 nm (50-250), and preferably the amylopectin percentage of the starch is high. The latex is used as a glue in the manufacturing of corrugated cardboard.

The WO 00/69916 application publication presents nanoparticles of biopolymers. The average particle size of these nanoparticles is <400 nm. The biopolymer is either a starch, a starch derivative or a polymer blend containing at least 50% starch. The crosslinking is achieved by using dialdehydes or polyaldehydes, such as glyoxal. In the processing, a plasticizing agent, such as glycerol, is present. The dispersion was prepared from granulate according to the examples, by grinding it and screening out particles bigger than 150 µm, and mixing the resulting powder into water. A homogeneous, transparent light brown dispersion was formed following a viscose gel phase. A disadvantage associated with the known technology is that the dispersion forms a transparent film when drying. Consequently, known nanoparticles are not suitable as coating pigments or fillers for paper or cardboard, and their use in this way is not mentioned in the reference publication, either.

U.S. Pat. No. 6,562,459 presents the preparation of round microparticles which consist totally or partly of at least one polysaccharide, insoluble in water. The polysaccharide is dissolved in an organic solvent and precipitated, possibly cooled, and the microparticles are separated. These microparticles are used as fillers in polymers, in the separation of materials and in diagnostic tests. There is no reference to pigment use or applications for paper. Amylose-enriched starch or linear poly(1.4-alpha-D-glucan) is used in the preparation. Among others, glycogen and amylopectin are blended into straight-chain polyglucan. In one known solution, the water insolubility of amylose/amylose-rich starch is utilized and, consequently, it was necessary to use only straight-chain starch. The solvent used, namely dimethylsulphoxide, is a toxic chemical and being a material which boils at a high temperature, it is difficult to remove from the product, which limits the usability of the product.

FI Patent Specification No. 98943 presents a method of improving the properties of paper or cardboard, and in particular it relates to a method in which the surface of paper or cardboard is treated with a compound which comprises a binding agent and a pigment component. Part of the pigment is formed of an aqueous phase-polymerization product of polymerized monomers and modified starch. In this method, vinyl monomers are polymerized in the presence of starch. In the reaction, monomeric compounds are grafted into the starch and the product is used to partly replace mineral pigments in the coating paste.

The grafting process is complicated and the pigment obtained is a mixture of natural substance and synthetic polymer. This limits the recycling and the biodegradation of the pigment.

It is an aim of the present invention is to eliminate the disadvantages associated with the known technology and to generate a completely new pigment or filler product, one which is based on starch.

The present invention is based on the idea that starch-based pigments and fillers can be prepared by means of a two-stage method, one in which the starch-based material is first dissolved in an organic solvent or, alternatively, in a homogeneous mixture of an organic solvent and non-solvent, for example water. The starch component is then precipitated from the mixture by diluting the solvent with a non-solvent.

Surprisingly, it was discovered that almost ideally shaped spherical particles can be prepared from starch ester in the way described above. Furthermore, it was found that one characteristic property of them is the size, which can vary within broad limits, typically in the range of 90-1000 nm. However, the particle size distribution can be very narrow. By observing the refractive index of starch ester, it is possible in theory to calculate that within the particle size range of 100-300 nm, the optical properties of spherical starch ester particles are better than those of for example PCC pigment, which is commonly used.

According to the present invention, starch esters, such as starch acetate, can also be precipitated from organic solvents or from water in such a manner that light nanoporous material is generated. In this context, nanoporous material means that the light scattering property of the material originates from its fine structure particles of less than 500 nm. The primary particle size, the microparticle size, of nanoporous starch can vary within broad limits, 1-100 microns. If desired, it can be used, too, as a coating pigment or a filler.

More specifically, the method according to the present invention is characterized by what is stated in the characterizing part of claim 1.

The pigment and filler products according to the present invention are, in turn, characterized by what is stated in the characterizing part of claim 22 and 25, respectively.

Considerable advantages can be achieved with the invention. Therefore, the present light and biodegradable organic pigment and filler can be used for instance in the manufacturing of a printable white paper product. Although the starch esters are water insoluble, when the degree of substitution of esterifying groups is 0.5-3, they are still of a polarised character and, consequently, they can be attached to surfaces by means of strong hydrogen bonds. As a result, the strength of the paper is not weakened as the amount of filler increases, which is common when inorganic pigments are used. Regarding filler retention, the nanoporous starch ester particles offer an interesting advantage when compared with mineral pigments and synthetic pigments: the size of porous particles can, in principle, be increased without causing problems for the techniques used for smoothing the surface of the paper.

Pure starch esters are white coloured biodegradable polymers with a high oxygen content, and with a glass transition point of +159 . . . +162° C. Consequently, like inorganic minerals, it is possible to grind them to a desired particle size. Unexpectedly, we found that it is not necessary to bleach the primary starch material with a separate process. The ISO brightness of high quality starch acetate compressed to a tablet is over 94, which means that it is comparable to most of the commercial pigments. The pigment according to the present invention is characterized by the fact that even small dosages—less than 5 $g/m^2$—of starch pigment, produce a considerable improvement in the brightness and opacity of the paper product.

Starch ester is dispersed from a solution without the use of additives into water, and, according to the reactor engineering technique it forms spherical particles or nanoporous microparticles. According to the present invention the desired properties of the starch polymer are achieved by controlling the molar mass of the starch ester. The production process of the initial starch material enables for example the attachment of ionic groups, which affect the surface properties of particles, to glucose polymer. The primary particle size of nanoporous micropieces can be set to a desired level by bringing mechanical energy or ultrasonic energy to the suspension.

A difference in the present invention compared with the above-mentioned reference publications is that plasticizing materials are not needed to manufacture the present product. Different starches can be used as the initial material; in the method it is not necessary to limit oneself for example to straight-chain starch, such as in the known technology. All of the starch can be esterified and used in the production of pigments. In this way, the desired degree of esterification is achieved and even high degrees of substitution are possible, too. Solvents which can be easily removed from the pigment because of their low boiling point (generally below 100° C.), can be used in the present invention.

In the following, the invention will be examined and explained in more detail, with accompanying examples of how it is applied.

FIG. 1 shows an electron microscope image (SEM image) of a cardboard, coated with pigment, prepared according to example 1;

FIG. 2, likewise shows an SEM image of a pigment that has been prepared according to example 2, and then applied to the cardboard surface;

Figure 1:
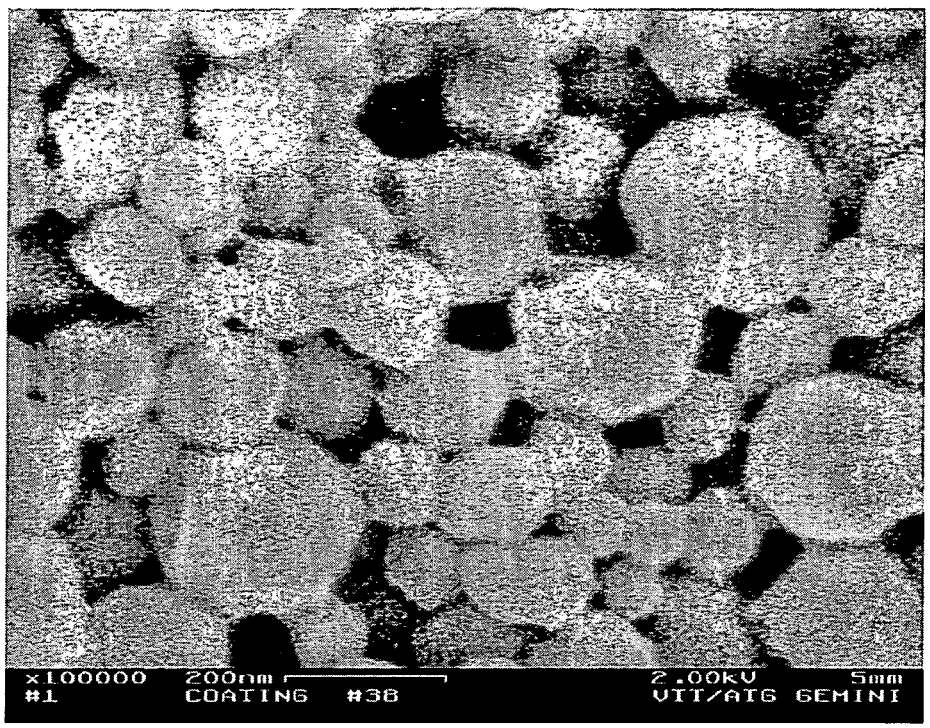

The present invention generates new kinds of starch-based pigments and fillers which are suitable especially for use in paper and cardboard products. However, they can be employed elsewhere, too, such as in paints, plastics and rubbers, to replace usual the mineral, and correspondingly, polymeric pigments and fillers. The products are also suitable for detergents and cosmetic products.

The pigments and fillers are prepared by dissolving a starch-based component in a solvent, from which the component is precipitated by bringing the solution into contact with a precipitating agent, that is hereinafter also with a "non-solvent". The solvent is removed, for example by evaporation, from the dispersion generated in the precipitation phase, and the precipitate is separated from the precipitating agent and then recovered.

The starch-based component used as the initial material in the present invention is a "functional" starch derivative. In other words, this is a product which is generated from starch by a chemical reaction, and at least part of the anhydrous glucose units of which have groups which modify hydroxyl functions. Typically, the starch derivative is a starch ester prepared from native starch, hydrolyzed starch, oxidized starch, bridged starch or gelatinized starch.

The starch used, in turn, can be based on any natural starch, the amylose percentage of which is 0-100% and the amylopectin percentage is 100-0%. Consequently, the starch can originate from barley, potato, wheat, oats, pea, corn, tapioca, sago, rice or similar tuber vegetables or cereal crops.

It is found appropriate to use a starch-based component which is derived from an ester formed both of starch and one or several aliphatic $C_{2-24}$-carboxylic acids. In this case, the carboxyl acid component of such an ester can be derived from a lower alcanoic acid, such as acetic acid, propionic acid or butyric acid, or a mixture of them. According to a preferable embodiment the starch component is an esterified starch, most preferably a starch acetate, the degree of substitution of which is 0.5-3, preferably 1.5-3 and most suitably 2-3. The degree of substitution of starch ester is chosen so that the product is essentially insoluble in the precipitating agent used in the method.

Provided that the glass transition point of the starch ester is high enough for the desired application, the carboxyl acid component can, in principle, also come from saturated or unsaturated fatty acids found in nature. Palmitinic acid, stearic-acid, oleic acid, linolic acid and mixtures of them are typical examples. Also, an ester can consist of both long chain and short chain carboxyl-acid components. A mixed ester of acetate and stearate is a typical example. According to a known method, not only acids but also corresponding acid anhydrides and acid chlorides, and other corresponding reactive acid derivatives, can be used to form an ester, too.

Production of fatty acid esters of starch is carried out, for example, as described in the professional publications: Wolff, I. A., Olds, D. W. and Hilbert, G. E., The acylation of Corn Starch, Amylose and Amylopectin, J. Amer. Chem. Soc. 73 (1952) 346-349 or Gros, A. T. and Feuge, R. O., Properties of Fatty Acid Esters of Amylose, J. Amer. Oil Chemists' Soc 39 (1962) 19-24.

Lower ester derivatives, such as starch acetates, can be prepared by bringing starch to react with an acid anhydride, for instance acetanhydride, which corresponds to the ester group, in the presence of a catalyst. For example, a 50% sodium hydroxide solution is used as a catalyst. Moreover, other known methods of producing acetates, described in professional literature, are suitable for the production of starch acetate. By varying the amount of the acetic anhydride, the amount of the alkali used as a catalyst, and the reaction time, starch acetates with different degrees of substitution can be prepared. A method described in FI patent 107386 in which the esterifying is performed under pressure conditions is one good example of a suitable production process.

The properties of starch ester can preferably be modified by forming trans-glycosylate products of them.

According to another preferable embodiment, the starch component is an ester of hydroxyalkylated starch. In this case, more preferable are hydroxypropyl starch esters, the molar degree of substitution of which is at most 2, preferably at most 1 and more preferably 0.1-0.8, and the degree of substitution is a minimum of 1, most suitably at least 2, preferably 2.5-3.

In the present invention, the preferred choice of starch polymer is one which does not dissolve in water, and which has a glass transition temperature of at least +60° C. and preferably 150-170° C. or higher, but generally below 350° C., or a starch polymer which will not break down at these temperatures. One of the basic requirements for choosing the glass transition point and, correspondingly, the temperature endurance, is that the glass transition temperature of the product (or breaking down temperature) is not exceeded—more than momentarily—at the preparation and operating temperature of the pigment or the filler, or during the preparation process of the end product, in a way that the pigment or the filler loses its advantageous, light scattering optical properties.

The polymer chain comprises at least 10 glucose units, and at least 1 acetyl group per glucose unit. According to a preferable method of implementation, the polymer chain comprises 100-150 glucose units and 2-3 acetyl groups per glucose unit. According to another embodiment, the basic structure of the starch is disintegrated in a way that its separation from a solution to spherical particles takes place spontaneously. The molecular weight distribution of the starch polymers can be wide. According to a preferable embodiment, the polydispersity index of the starch polymer is 1.5-2.0.

In the first stage of the method according to the present invention, the starch polymer is dissolved in a solvent, particularly in one or in several organic solvents, or a mixture of these and water, and as a result, a solution is obtained, the starch polymer concentration of which is at least 1% by weight, preferably a maximum of approximately 40% by weight and typically approximately 10-30% per weight.

Preferably, the starch polymer is completely dissolved in the chosen solvent, but the present invention also comprises an application in which part of the initial material (the starch derivative) is dissolved in the solvent and part is left in an insoluble form. In this case, in the precipitation stage (see below) which follows the dissolving stage, the dissolved part is precipitated into the insoluble part, generating a composite product which comprises both material containing the original granule structure, and precipitated material which comprises either spherical particles or microporous material. The relative percentages of the insoluble and the dissolved initial material (as weight fractions) can be approximately 10:90 . . . 90:10, preferably approximately 20:80 . . . 80:20, most suitably approximately 30:70 . . . 70:30.

According to a preferable embodiment, the viscosity of the solution (or the solution fraction) is near the viscosity of water, or maximum 1.5-5, typically maximum 4-5 times higher.

The easiest way to meet the solubility and viscosity requirements mentioned above is to split the starch using a technique such as oxidizing, hydrolyzing with an enzyme or an acid, or to modify it by means of transglycosylating, etherifying or ultrasound.

In a preferable embodiment, in which it is desired to dissolve all the initial material, according to the present invention, a perfectly suitable solvent is used, which can be blended in all proportions with water. Preferably, the solvent is volatile and, consequently, easy to distill. "A perfect solvent" of the starch means one in which the solvent in question acts as a plasticator of the starch. In other words, they can be mixed in all proportions with the starch polymer.

Recommended solvents are straight-chain, branched and cyclic ketones, such as acetone and tetrahydrofurane, and alcanoic acids, such as acetic acid. Possible solvents are mono-ols, diols and polyols, such as ethylene glycol, diethyl glycol and ethoxy ethyl glycol, and other kinds of organic solvents, such as ethyl and methyl formiate, pyrrolidone and dimethylsulphoxide.

According to the present invention, excess solvent should be avoided. Usually, it is sufficient to prepare a solution of a starch derivative, using only enough solution to ensure a complete dissolution of the starting material, or, at the most, a slight excess, such as an excess of maximum 20-30% by weight.

Together with a perfect starch solvent another solvent can be used which alone cannot be used as a solvent. Consequently, suitable solvents which can be used together with acetone or tetrahydrofurane are, for example, methyl, ethyl, propyl and isopropyl alcohols.

In principle, it is possible to consider other solvent systems, as well. Mark S=starch, and give the intercompatible ABC solvents the symbols: A (starch solvent), B or C are solvents, which starch does not dissolve in. Resulting functional combinations are AS+B, AS+C, ABS+B, ABS+C and ACS+B. (For example acetone/ethanol/starch+ethanol or acetone/ethanol/starch+isopropanol).

As noted above, the present invention can be used to produce two kinds of pigment and filler agents which are either a product comprising spherical particles or a nanoporous product, which are also described below as being "coral like". Both of them are prepared by bringing a solution of a starch derivative in contact with a precipitation agent (non-solvent). In this case, the non-solvent is a material which does not meet the above-stated definition of a starch derivative solvent, which means that it is an agent capable of precipitating as totally as possible the starch derivative in the solution, when there is a large enough quantity of that solution in the liquid system. Generally, at least 70% by weight of the starch derivative in the solution is precipitated, preferably at least 80% by weight and more preferably 90% by weight, even at least 95% by weight. Depending on the solvent or the solvent solution, the quantity of the non-solvent is generally 0.1 ... 100 times the quantity of the solvent or the solvent solution (calculated by weight), preferably approximately 0.5 ... 10 times, most suitably approximately 0.7 ... 5 times.

A conventional precipitation agent is water or a corresponding polar liquid, such as a $C_1$-$C_6$ alkanol, or a non-polar carbon hydride, such as a $C_{4-20}$-alkane, preferably a $C_{5-10}$-alkane, or a mixture of alkanes.

Spherical particles, the particle size (average diameter size) of which is 90-1000 nm, preferably less than approximately 500 nm, more preferably less than 400 nm, particularly less than 350 nm, are formed spontaneously, when the starch solution mentioned above is diluted with water or a corresponding non-solvent. The dilution can take place rapidly and turbulently. It can also take place slowly, in which case mixing is used to mix the two liquids with each other, and for example boundary layers originated from density differences of liquids are avoided.

According to a preferable embodiment, the diluting of the starch solution is started from a point where the water percentage in the solution system is at its maximum. Here, maximum means that beyond this point, the starch polymer is no longer fully soluble in the solvent system. Naturally, this point depends on the polymer used.

Preparing the particle dispersion does not necessarily demand the use a separate auxiliary dispersing agent. However, the auxiliary agent can be useful for the storage stability and possible further processing of the dispersion. Further processing would be, for example, washing, drying to a powder, or making a coating paste.

In the preparation of spherical pigments, the water addition rate is generally 50-4000 ml/s, preferably 80-450 ml/s, most preferably 100-250 ml/s, depending on the mixing conditions, the temperature and the concentration of the starch solution. In the preparation of coral pigments and pigments for the filling material level, the starch solution is added into the water at considerably lower addition rates: 0.05-90 ml/s, preferably 0.1-20 ml/s and most preferably 0.3-3 ml/s.

After the precipitation stage, the organic solvent (organic solvents) is removed from the dispersion. The solvents are harmful to the further processing of the precipitate, and the solvent residues of the pigment or the filler may plasticize the particles, and lead to reduced optical properties of the particles. These features are described in more detail in the reference examples below. Usually, the aim is to reduce the quantity of solvent residue to the point where is it is below the detection limit of the NMR technique used. As a result, in the precipitate separated from the liquid phase after removal of the solvent there are no organic solvent residue quantities that can be detected by a 300 MHz NMR device.

According to a preferable embodiment, the pigment purity determined by NMR technique is at least 98% starch polymer, having a degree of acetyl substitution (DS) of 2 and exhibiting solvent residues at concentrations of less than 0.5%.

When or after the particles are formed, mechanical energy or ultrasound energy applied to the solution can be used to influence on the uniformity of the particle size distribution. This means that for example the particle clusters are broken down. The shape of the particles can be changed from a spherical to elliptical form using strong laminar rotation.

The particles are separated using methods which are known per se, for example filtration, micro-filtration, decantation or centrifugation.

Besides as a single-stage precipitation described above, the precipitation can also be carried out in two stages, which means that after the precipitation made with the first precipitating agent and after a possible precipitate separation, the fines dispersed in the liquid phase are salted out from it (provided that, for instance, water in which the added salt is dissolved is used as the non-solvent), or separated from the liquid phase in some other way. As a result, very small spherical particles are obtained, as described in the examples below. For the salting out, a suitable inorganic salt can be used, such as sodium sulphate or the like, which is easily dissolved in the liquid phase. The quantity of the salt to be added is generally approximately 0.1-20% by weight of the solution, preferably approximately 1-10% by weight.

The solution mentioned above is particularly suitable for cases in which the starch based material is dissolved in a homogeneous mixture of an organic solvent and water. When more water is added into a solution like this, for example at room temperature (approximately 15-25° C.), a milk-like particle dispersion is obtained. By using centrifugation to separate the smaller components from the bigger particles, particles with a narrow pigment particle distribution (an average of approximately 200 nm) are obtained.

With the two-stage precipitation, two fractions are thus generated, namely a coarse fraction, the size of the spherical particles of which is generally 300-1000 nm, and a fine fraction, the size of the spherical particles of which is smaller than 300 nm.

The starting point of the preparation of the other material mentioned above, namely the micro-porous starch pigment, can be exactly the same as above if the non-solvent used for the precipitation is water. However, the procedure is reversed: the solution comprising the dissolved starch derivative is added into the non-solvent.

According to a preferable embodiment, an acetone: water/starch solution is mixed (combined) in proportion 0.1:10, preferably approximately 1:3, in water, and the result is a narrow distribution where the particles are concentrated in a primary size range of over 1 micron, typically 5-30 microns, for example approximately 12.3 microns. Generally, a relatively slow addition of an organic phase into the water phase facilitates the formation of a very porous, coral-like pigment structure of this kind.

Ultrasonic energy can be brought to the system, too. It can be used to bring the primary particle size to an average of 1 micron.

In an alternative solution, a coral-like structure is generated by using an organic solvent system. At the starting point, the starch component is dissolved as described above, and the precipitation is carried out from a solvent which does not dissolve starch. Mixing ensures that the solvents blend with each other. The mixing can be a rapid laminar rotation, carried out by injection, or a slow mixing carried out by feeding in drops. The solution affects the porosity of the starch generated, and the result varies to some extent, depending on whether the precipitating solvent is for example petroleum ether, n-hexane or a technical LIAV type of carbon hydride solution.

The method described above is usually carried out at room temperature (approximately 15-25° C.). It is also possible to operate at a higher temperature, but a temperature which still is lower than the boiling point of the solvent and the nonsolvent. Below is an example of a hot process. As becomes evident from it, the temperature can be approximately 30-80° C., which means that the temperature can be kept lower in the dissolving stage and then be raised in the precipitation stage. It is also possible to reverse the operating order here.

The present method can be used to generate starch-based pigment and filler products with the following properties:
1. spherical particles, the size of which is generally approximately 100-500 nanometres and the ISO brightness of which is over 80, and, correspondingly
2. micro/nanoporous particles, the size of which is approximately 1-100 microns, and which comprise (generally spherical) pores, the average size of which is approximately 100-500 nanometres.

The ISO brightness of the first mentioned products can be up to 92-96, and of the latter products up to at least 80, too, most suitably at least 82, preferably at least 84.

The particle size distribution of the spherical particles is generally quite narrow. At least 50% by weight of the particles, preferably at least 70%, particularly at least 80%, are included in the range mentioned (100-500 nm).

Spherical particles are used particularly as pigments, and coral-like particles as fillers. The areas of application are the above-mentioned, namely paper and cardboard, paints, plastics, rubbers, cosmetics, hygiene products, and detergents and other chemical products.

EXAMPLE 1

Preparation of Starch Acetate Based Coating Pigment Using an Acetone Process

Starch acetate (6 g, ISO brightness 68.7) was dissolved in acetone (200 ml) under thorough mixing. When the starch acetate was totally dissolved, 120 ml of water were added into the solution for a period of 5 minutes to avoid the starch acetate precipitating out from the solution. After that, the solution was diluted with water to a volume of 600 ml. The water was added very rapidly, in about 6 seconds, while at the same time the mixture was briskly mixed. Following the addition, a white emulsion was formed. The acetone was then removed by evaporation. The product was centrifuged (15 minutes, 5000 rpm), causing the largest particles to sediment. The precipitate was then decanted and washed with water. Finally, the product was stored as a 20% slurry. The product quantity was 10 g.

The milk-like emulsion phase which did not sediment out during the centrifugation, was treated with a sodium sulphate solution (3% of the solution mass) resulting in the particles being separated from the liquid phase. The precipitate was decanted and washed three times with water. The amount of product was approximately 2 g, converted to dry matter. The paper was coated with the pigment (10 g/m$^2$) and the ISO brightness of the product was measured to be 70.

FIG. 1 shows an electron microscope image of cardboard coated with pigment prepared according to the present example.

COMPARATIVE EXAMPLE 1

Preparation of Pigment Using an Acetone Process, Only Partly Evaporating the Acetone A Reference Example for Example 1

The procedure was the same as in example 1, but the acetone was evaporated at room temperature, letting it evaporate only almost totally from a flat bowl. The product was treated as in example 1. After the product was applied onto the cardboard surface and it had dried, it was observed that the pigment particles had formed a transparent coating, because of the plasticizing and dissolving effect of the residual acetone. Consequently, the pigment coating did not improve the brightness of the cardboard.

On the basis of this reference example it is clear that a good solvent of starch acetate, such as acetone, must be almost completely removed from the pigment dispersion before the product is acceptable as a pigment.

EXAMPLE 2

Preparation of a Starch Acetate Based Coating Pigment Using an Acetone-Ethanol Process A solution was formed of ethanol (500 ml), water (250 ml) and acetone (200 ml). Fine starch acetate (60 g, ISO brightness 68.7) was added while mixing to the blend. After the polymer was dissolved, 2500 ml of water was added to the blend, which was simultaneously mixed very vigorously for approximately 5 minutes. This generated a white dispersion, which was allowed to mix for 10 minutes.

The solvents were evaporated from the dispersion. When the solvents were evaporated, the dispersion was centrifuged (15 minutes/5000 rpm). The smallest particles remained in the emulsion phase. The precipitate was washed three times with water in centrifuge tubes. After the last centrifugation, the precipitate remained as an approximately 20% sludge. The yield was approximately 30 g.

Using Na$_2$SO$_4$, a pigment having small sized particles was precipitated from the milk-like solution that was removed during the first centrifugation. A quantity of Na$_2$SO$_4$ amounting to approximately 3% of the solution mass was added. The precipitate was separated by centrifugation (15 minutes/5000 rpm) and washed three times with water. The yield was approximately 10 g.

Figure 2:
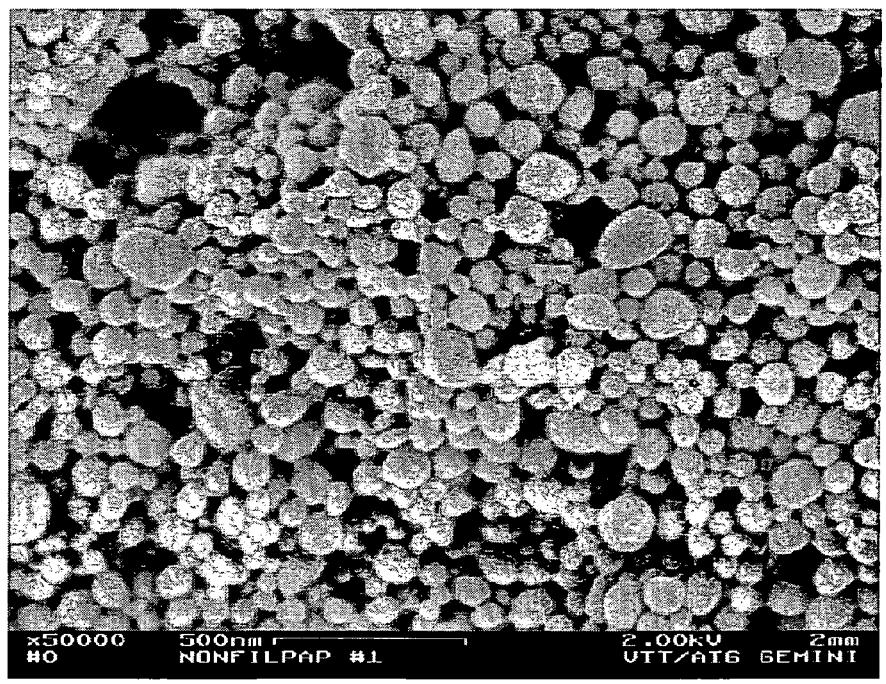

An electron microscope picture that was taken of the pigment coated cardboard suggested that the particles are almost round and <300 nm in size (see FIG. 2).

EXAMPLE 3

Preparation of a Starch Acetate Based Coating Pigment Using a Hot Process

A solution was formed of ethanol (200 ml), water (50 ml) and acetone (300 ml). Starch acetate (60 g, ISO brightness 89.1) was added to the solution, using a motor-driven mixer. After the polymer was dissolved, the solution was warmed up to 40° C. 300 ml of ethanol (at 40° C.) were then added in small volumes. After this, 100 ml water (40° C.) was added in small volumes, or until the solution started to become turbid. Next, this solution was added to 2000 ml of water (at 60° C.). A protective colloid polymer (Kemira A41) was added in an amount of 5 g to the water. The emulsion-like product was cooled.

A quantity of $Na_2SO_4$ amounting to 3% of the solution mass was added to the solution. The precipitate generated was decanted away from the solution. Centrifugation (15 minutes/4000 rpm) was performed, followed by a washing with water, carried out two times in a centrifuge tube. The yield was approximately 120 g of a pigment product with a dry matter content of 32%.

Figure 3:
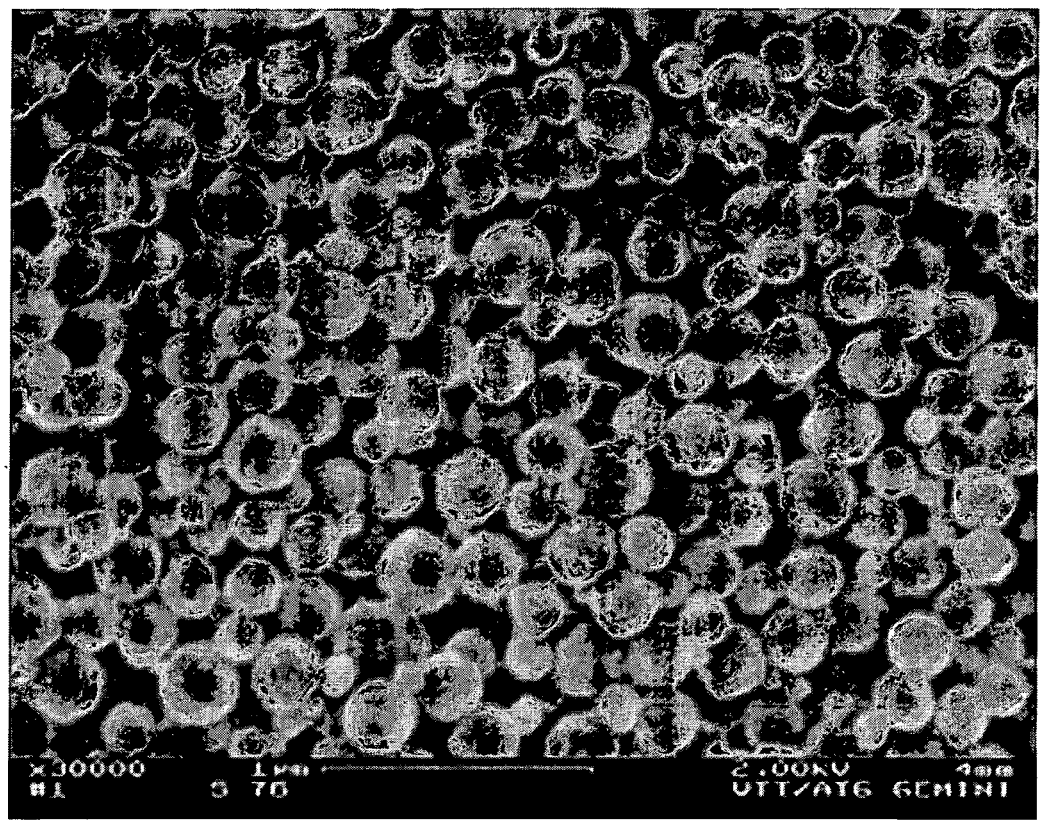
FIG. 3 is an SEM image of a product prepared using a hot process.

On the basis of an electron microscope image (SEM) of the product, it is observed that the particles are spherical and their average size is 200 nm (see FIG. 3.).

EXAMPLE 4

Preparation of a Starch Acetate Pigment Using an Acetone Process at Pilot Scale

A quantity of 2.1 kg of starch acetate (ISO brightness 68.7) was dissolved in 49 kg of acetone and 10 kg of water. A quantity of 60 kg of water was then added while vigorously mixing (homogenizer, 1500 rpm). After the water was added, a white emulsion was formed. The acetone was evaporated off from the cooled emulsion, and the product was concentrated by micro-filtration to 10 liters.

The product was dried by spray drying in two batches. Polyvinyl alcohol (Mowiol 10-88) was added to the first batch as a protective colloid. The second was dried without an auxiliary agent.

The ISO brightness of the products measured from compressed tablets was 83.7 without the addition of Mowiol, and 83.8 with it.

The percentage of residual acetone in the product was determined using the NMR technique. The percentage was below the detection limit.

COMPARATIVE EXAMPLE 2

Preparation of Pigment Using an Acetone Process without Acetone Evaporation Before the Concentration of the Pigment A Reference Example for Example 4

The procedure was the same as in example 4, but the acetone was not removed before the micro-filtration. The result, it was observed, was that the particles of the emulsion generated had attached to each other and formed a large particle precipitate, which blocked the micro-filter.

On the basis of the example, it is concluded that the acetone complicates further processing.

EXAMPLE 5

Preparation of Starch Acetate Pigment Using an Acetone-Ethanol Process at Pilot Scale A quantity of 0.75 kg starch acetate (ISO brightness 89.1) was dissolved in 20 kg of acetone. Volumes of 12.5 kg of water and 20 kg of ethanol were added to the solution. A check was made to ensure that all the starch acetate was dissolved. A quantity of 125 kg of water and, as a protective colloid, 62.5 g of Kemira A41 polymer, were added over a period of 20 minutes. A milk-like emulsion was formed, from which the acetone was evaporated off in a vacuum over a period of 3 hours (112 mbar/40° C.). The product was concentrated to a percentage of 10%, using micro-filtration (50 hours).

Figure 4:
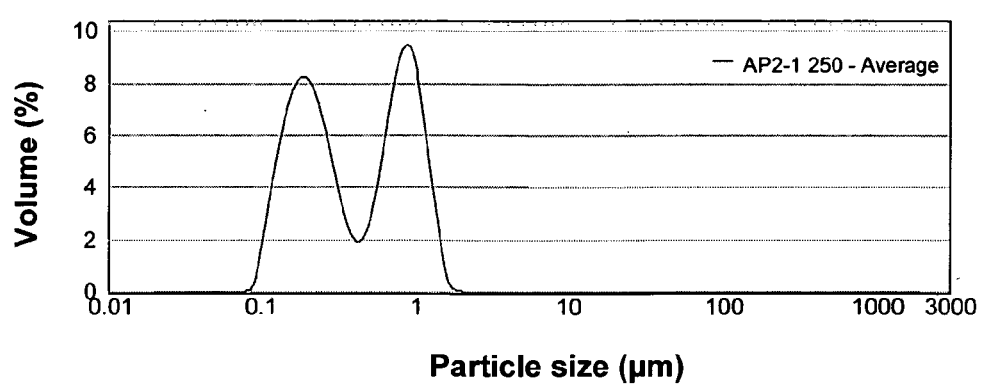
FIG. 4 shows the particle size distribution of a pigment prepared using an acetone-ethanol process at a pilot scale.

The particle size distribution of the pigment prepared in this way is shown in FIG. 4.

EXAMPLE 6

Preparation of Coating Pigment from Starch Acetate at Pilot Scale, Using a Higher Concentration Volumes of 16.8 kg of acetone, 11.2 kg of ethanol and 3.5 kg of water were mixed. The solution was warmed up to 60° C., and 4.2 kg of starch acetate (ISO brightness 89.1) were added. The temperature of the solution was lowered to 40° C. Then, 16.8 kg of ethanol at room temperature were added, followed by 140 kg of water in which a protective colloid (Kemira A41) had been dissolved, the quantity of which was 2.4%, calculated from the starch acetate. This was carried out over a period of 20 minutes while simultaneously maintaining the temperature between 40 and 50° C. and mixing thoroughly all the time. Subsequently, the acetone was evaporated off in a vacuum. The dry matter percentage of the emulsion-like product was 2.8% after the acetone evaporation.

After that, the product was micro-filtered and concentrated during the micro-filtration, and washed with water. The quantity of the end product was 16.3 kg and the dry matter percentage 23%. The ISO brightness, measured from the dried product, was 94.4.

The residues of organic solvent in the product were determined using the 300 MHz NMR technique. The percentage of the residues was <0.5% per weight, which is below the detection limit of this technique.

Figure 5:
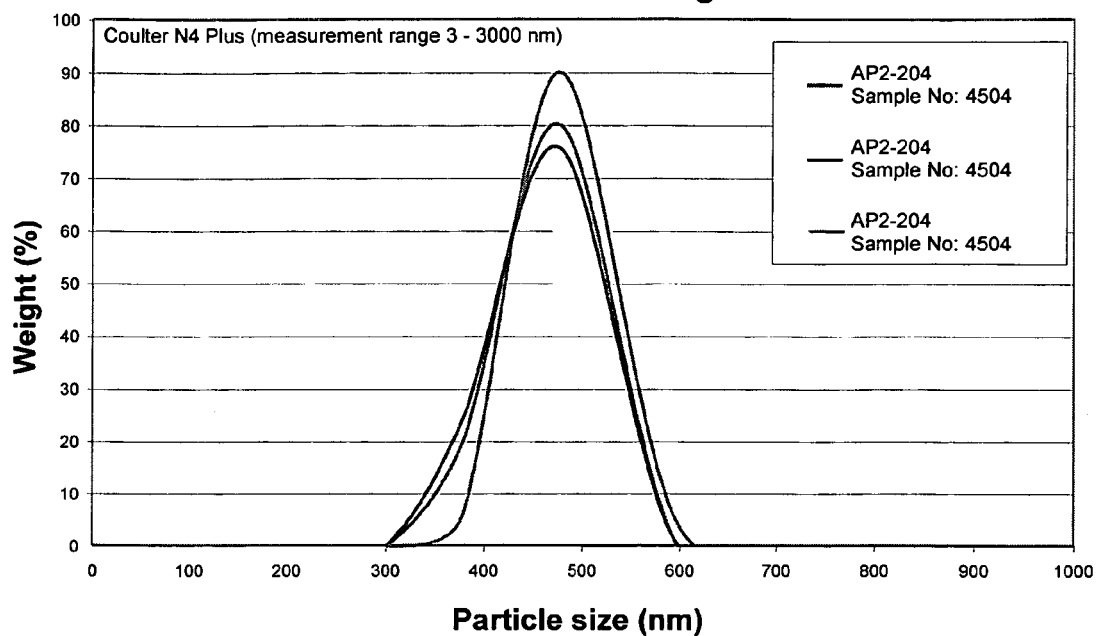
FIG. 5 shows the particle size distribution of a pigment according to example 6 (three parallel measurements)
Figure 6:
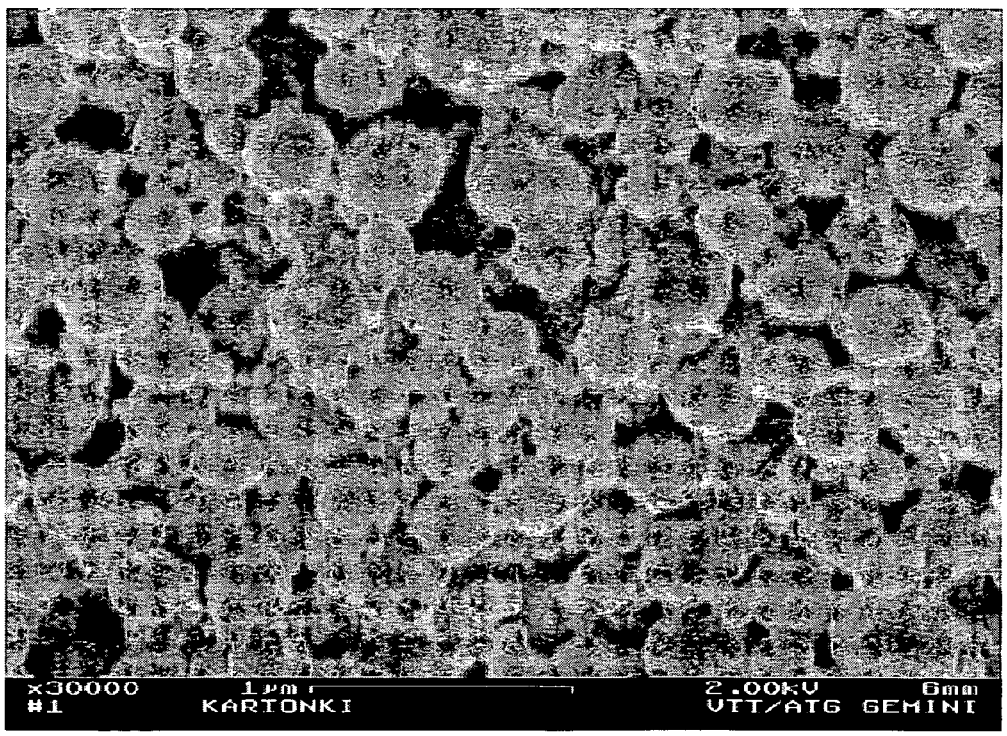
FIG. 6 shows an SEM image of a pigment according to example 6, at the cardboard surface
   it should be pointed out that the smallest particles are latex particles, which were used as a binding agent in the coating.

FIG. 5 shows the particle size distribution of the pigment (three parallel measurements), and on the basis of the SEM image of the product, the pigment shape is spherical. The very smallest particles visible in the SEM image are latex particles, which were used as a binding agent in the coating.

EXAMPLE 7

Preparation of Coral-Like Starch Acetate Pigment Using a Water Precipitation Method A solution was formed from ethanol (500 ml), water (250 ml) and acetone (200 ml). Starch acetate (60 g, ISO brightness 68.7) was added to the solution while mixing. When the starch was dissolved, the solution was poured for 6 minutes at a constant rate into 2500 ml of water. Throughout the pouring, a thorough mixing was carried out. A white dispersion was generated during the addition. The mixing was continued for another 10 minutes after the addition. The starch acetate was then precipitated and, as a result, a second dispersion was formed.

The solvents were evaporated from the dispersion. The product was centrifuged (15 minutes/5000 rpm). The separated precipitate was washed three times with water in centrifuge tubes. After the final centrifugation, the product was left as a 20% sludge. The yield was approximately 35 g.

From the supernatant solution of the centrifugation, i.e. the milk-like liquid phase, a fine pigment was precipitated by salting out with $Na_2SO_4$ (salt 3% of the solution mass). The clear solution was decanted away and the precipitate was washed three times using centrifugation with water. The yield was approximately 15 g.

Figure 7:
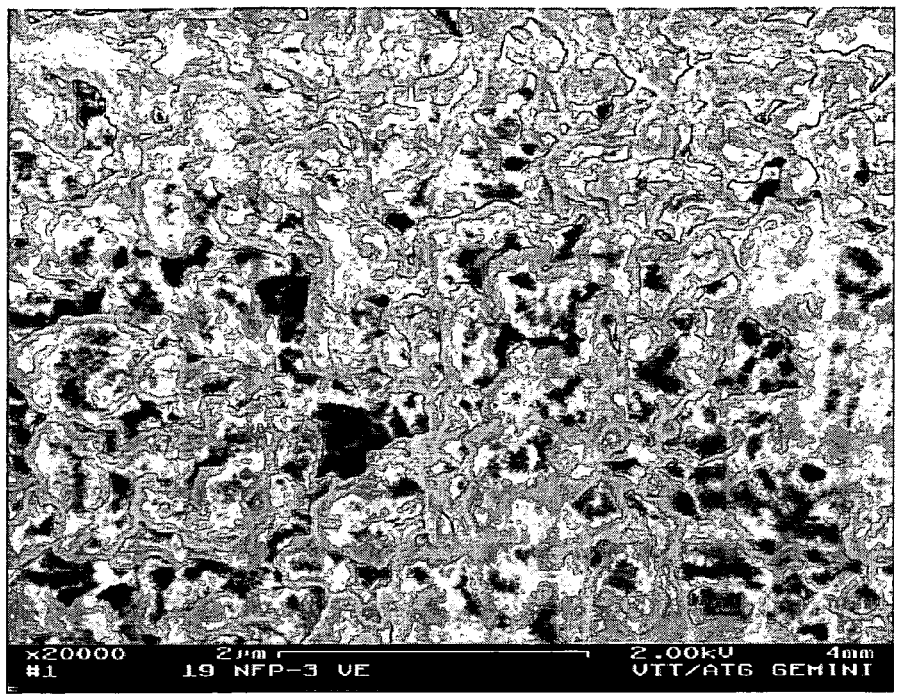
FIG. 7 is an SEM image of a coral-like pigment prepared by a water precipitation method.

FIG. 7 shows an SEM image of a coral-like pigment prepared using a water precipitation method.

EXAMPLE 8

Preparation of a Coating Pigment with a Coral-Like Pore Structure, Using Solvent Precipitation A quantity of 26 g of starch acetone (ISO brightness 68.7) was dissolved in acetone (400 ml). A quantity of 1000 ml of LIAV was fed into the solution over a period of approximately 10 minutes while mixing thoroughly. A white precipitate was formed and it was allowed to sediment. The bright solution was decanted away. LIAV (approximately 500 ml) was poured on to the precipitate so as to cover it with the solvent. Mixing was carried out for approximately 10 minutes. The precipitate was filtered at low-pressure, using a glass sinter (pore size 3). The precipitate was rinsed once more with LIAV (approximately 400 ml) using a filter.

The washed precipitate was dried. The yield was approximately 20 g.

Figure 8:
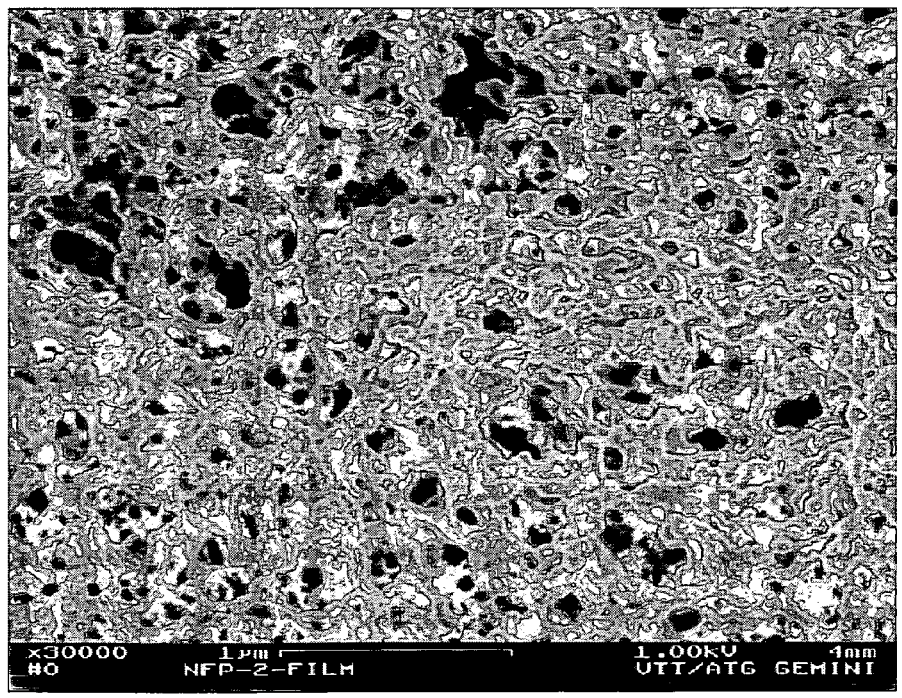
FIG. 8 is an SEM image of a coral-like pigment prepared by means of solvent precipitation.

The ISO brightness of the pigment, determined from a compressed tablet, was 87.7. On the basis of the SEM image (see FIG. 8), the product has a porous structure.

EXAMPLE 9

Filler Pigment Made of Starch Acetate

A starch derivative (dry matter content 6% of the total mass, ISO brightness 89.1) was dissolved into a mixture of ethanol (500 ml), acetone (200 ml) and water (250 ml). The solution was divided into three parts (approximately 300 ml/batch). Using a mixing speed of 750 rpm, the solutions 1-3 were each poured into 1200 ml of water, at 8-12° C., while vigorously mixing, and the addition times were: 1) 50 minutes (Experiment 1), 2) 45 minutes (Experiment 2), and 3) 60 minutes (Experiment 3).

The organic solvents were evaporated from the resulting dispersions. After that, sodium sulphate (15 g/2 l) was added into the solutions which caused the particles in the dispersion to separate and to sediment onto the base of the vessel. The precipitate was separated by decanting and washed two times with water. Finally, the precipitate was centrifuged (10 minutes/2500 rpm). Aggregate pigments that may have been generated in the process were removed using the Dispermat treatment.

Figure 9:
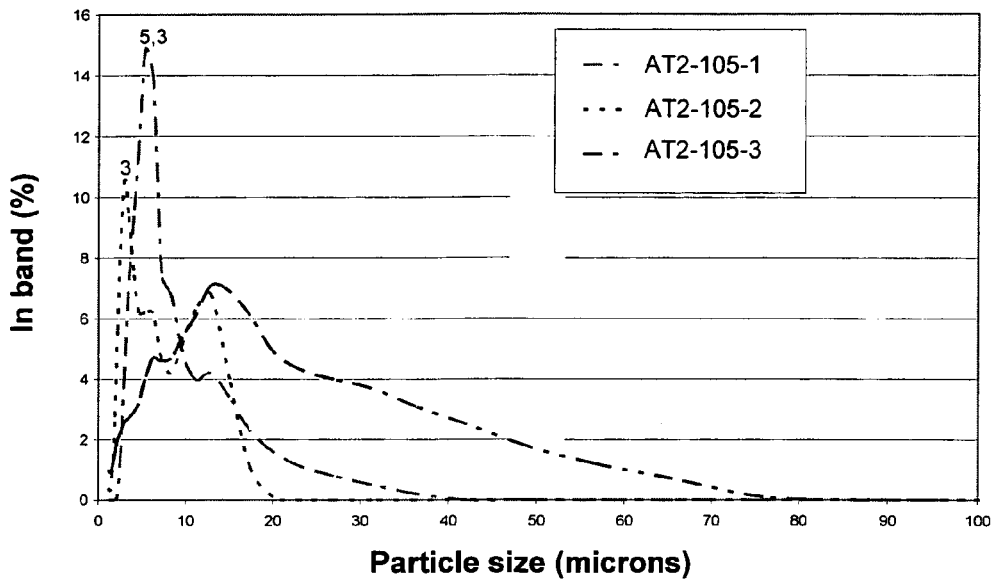
FIG. 9 shows the particle size measurements of pigments prepared using different rates of addition, where Experiment 1=AT2-105-1, Experiment 2=AT2-105-2, and Experiment 3=AT2-105-3.

FIG. 9 shows the influence of the rate of addition on the particle size distribution of the pigment. As the picture shows, narrower particle size distributions are achieved with higher addition speeds than with lower.

EXAMPLE 10

A Filler Pigment Made of Starch Acetate. The Influence of the Precipitate Concentration on the Particle Size Distribution of the Filler Pigment A starch derivative (dry matter content 6% of the total mass, ISO brightness 89.1) was dissolved into a mixture of ethanol (500 ml), acetone (200 ml) and water (250 ml). In the first experiment (Experiment 1), 425 ml of the solution were taken and poured over a period of 25 minutes into 850 ml of water, while mixing vigorously. In the second experiment (Experiment 2), the same volume was poured into 750 ml of water over a period of 25 minutes, while mixing vigorously. The organic solvents were evaporated from the resulting dispersions. After that, sodium sulphate (15 g/2 l) was added into the solutions which caused the particles in the dispersion to separate and to sediment onto the base of the vessel. The precipitate was separated by decanting and washed two times with water. Finally, the precipitate was centrifuged (10 minutes/2500 rpm). Aggregate pigments that may have been generated in the process were removed using the Dispermat treatment.

Figure 10:
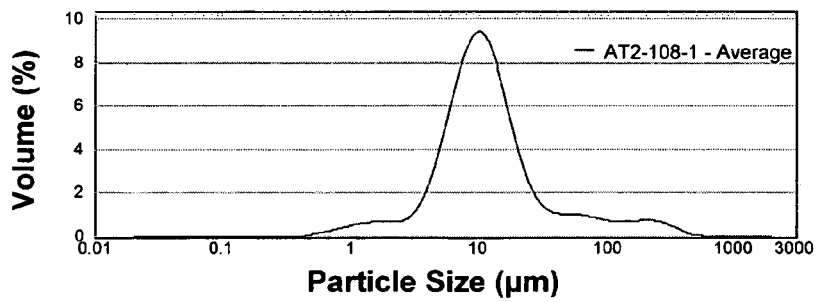
FIG. 10 shows the particle size distributions of the pigments according to example 10, where the pigments in Experiment 1 are shown in the upper figure and the pigments in Experiment 2 in the lower figure.
Figure 10:
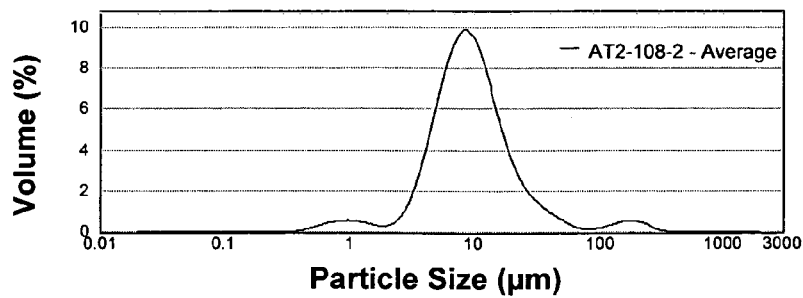
Figure 11:
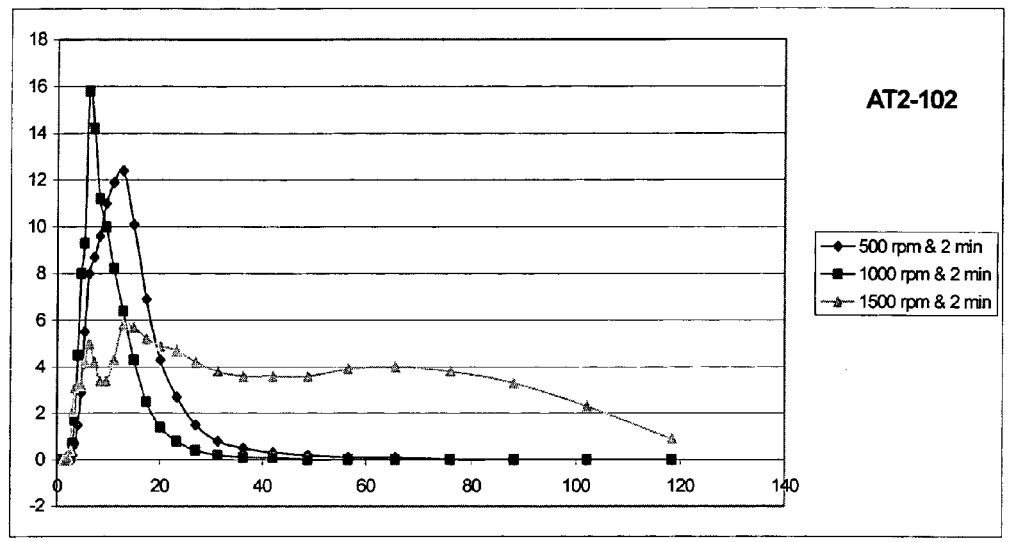
FIG. 11 shows the influence of the mixing rate on the particle size distribution of the filler pigment (example 11)

FIG. 10 shows the particle size distributions of the pigments. On the basis of the experiment, it was observed that a change in concentration affects the particle size distribution of the filler pigment.

EXAMPLE 11

A Filler Pigment Made of Starch Acetate

The Influence of the Speed of Rotation on the Particle Size Distribution of the Filler Pigment A starch derivative (dry matter content 6% of the total mass, ISO brightness 89.1) was dissolved into a mixture of ethanol (500 ml), acetone (200 ml) and water (250 ml). The solution was divided into three parts. Each one was added over a period of 2 minutes into 1200 ml of water, while mixing the water phase, using 1) a rotation speed of 500 rpm (Experiment 1), 2) 1000 rpm (Experiment 2) and 3) 1500 rpm (Experiment 3).

The organic solvents were evaporated from the resulting dispersions. Subsequently, sodium sulphate (15 g/2 l) was added into the solutions which caused the particles in the dispersion to separate and to sediment onto the base of the vessel. The precipitate was separated by decanting and washed two times with water. Finally, the precipitate was centrifuged (10 minutes/2500 rpm).

Aggregate pigments that may have been generated in the process were removed using the Dispermat treatment.

The influence of the mixing speed on the particle size distribution of the filler pigment is shown in FIG. 10.

EXAMPLE 12

A Filler Pigment Made of Starch Acetate

The Influence of the Initial Material Concentration on the Particle Size Distribution of the Filler Pigment 1) 60 g of starch acetate (ISO brightness 89.1) (Experiment 1), 2) 30 g of starch acetate (ISO brightness 89.1) (Experiment 2), 3) 15 g of starch acetate (ISO brightness 89.1) (Experiment 3), 4) 120 g of starch acetate (ISO brightness 89.1) (Experiment 4) and 5) 180 g of starch acetate (ISO brightness 89.1) (Experiment 5) was dissolved in a mixture of 450 ml of ethanol, acetone and water (5:2:2.5 w/w/w).

In Experiments 1-3, the solutions were added to 1250 ml, in Experiment 4 to 2500 ml and in Experiment 5 to 3750 ml of water respectively, over a period of 5 seconds, while mixing the water phase with a speed of rotation of 350 rpm. The organic solvents were evaporated from the dispersions generated. After that, sodium sulphate (15 g/2 ) was added into the solutions which caused the particles in the dispersion to separate and to sediment onto the base of the vessel. The precipitate was separated by decanting and washed two times with water. Finally, the precipitate was centrifuged (10 minutes/5000 rpm). The dry matter contents of the products were 13% (Experiment 1), 30% (Experiment 2), 36% (Experiment 3), 10% (Experiment 4) and 10% (Experiment 5).

Figure 12:
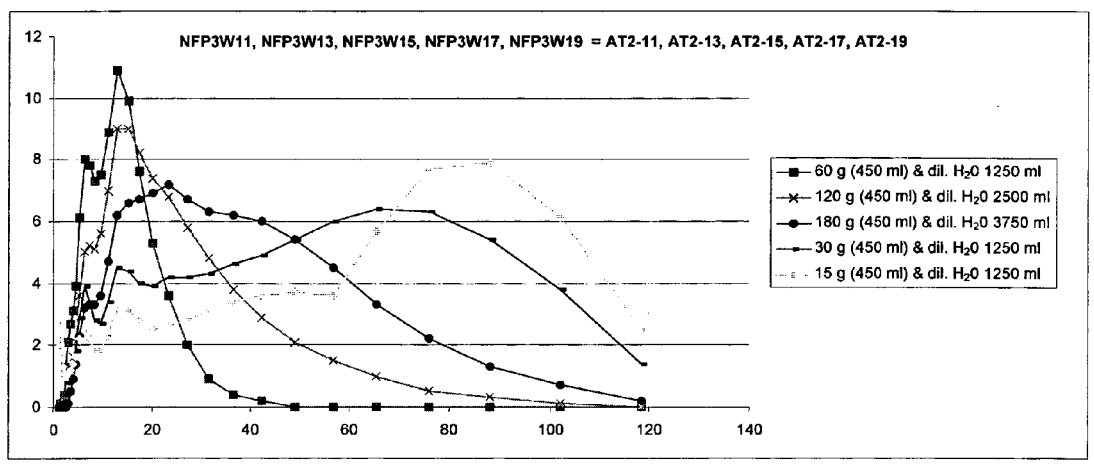
FIG. 12 shows the particle size distributions of the pigments prepared in example 12, with different percentages of the initial material.

The particle size distributions of the pigment prepared with different initial material concentrations, are shown in FIG. 12.

On the basis of the particle size measurements it was observed that the concentration of the basic material has an obvious influence on the particle size distribution of the filler pigment.

EXAMPLE 13

Preparation of a Pigment as a Continued Reaction of the Acetylation Process

At the starting point, 3.0 kg (as dry matter) of chemically or enzymatically split potato starch, 24.7 kg of acetic acid (100%), 4.07 kg of acetic acid anhydride, and 0.2 kg of sodium acetate as a catalyst were mixed. Acetylation was carried out at a temperature of 100-115° C., the reaction time being 3 hours. Next, the liquid reaction mixture was cooled to a temperature of 20° C., and 15 kg of cold water were added. The mixing was continued and the homogeneity of the reaction mixture was checked. After that, the dilution was continued by adding 8.8 kg of cold water making the solution permanently turbid. After that, 130 kg of water were rapidly pumped into the solution resulting in the generation of a white dispersion. The dispersion was partly neutralized by adding 15 kg of a 50% NaOH solution, and at the same cooling. The pH value of the starch dispersion was 4.0-4.5 after the neutralization stage.

The pigment was separated from the solution using centrifugation. The pigment sludge was cleaned by mixing it again with 50 kg of water and repeating the elutriation and centrifugation at least twice. After the cleaning, the pigment was mixed and homogenized in water to an operational concentration of 10-30%, using a Dispermat mixer.

Alternatively, the pigment can be separated from the water dispersion using micro-filtration. On the basis of the experiment, the preparation of the pigment can be carried out using an acetic acid solvent, too, without the stages of separating and drying the starch acetate.

EXAMPLE 14

Ultrasonic-Aided Preparation of a Pigment

Starch acetate was dissolved into a mixture of ethanol, acetone and water, as described in example 11. The solution was fed at a constant speed into 2500 ml of water, the temperature of which was at 14° C., and which was in an ultrasonic reactor. The frequency of the ultrasound was 22.2 kHz and the effect 500 W. Two rates of addition for each of the ultrasonic treatments were used: 2 minutes and 5 minutes. Then, the solvents were evaporated off and the particle sizes of the products were measured. The average particle size was 281 nm with the 2 minute treatment, and 187 nm with the 5 minute treatment.

EXAMPLE 15

Preparation of Filler Pigment Using Grinding and Grading Techniques

To reduce the particle size, pulverization and grading experiments have been carried out with three starch qualities, (potato starch triacetate, oat starch and crosslinked oat starch). Mainly, a two-stage process is used to produce fine particle fraction: grinding with a jet mill and, after that, classification with an air separator (Outokumpu Research Oy, Pori, Finland). Pearl mill grinding has been tested, too. Using a combination of a jet mill and air separation, the smallest particle size ($d_{50}$ 4.6 µm; $d_{90}$ 9.2 µm) was achieved with potato starch triacetate.

The tables below show the influence of processing on the particle size distribution of starch samples. The $d_{90}$ value tells that 90% by weight of the particles are of this size (µm) or smaller.

TABLE 1

Results of air classification and pulverization of starches.
C6N100 (potato starch triacetate)

|  | $d_{10}$ (µm) | $d_{50}$ (µm) | $d_{90}$ (µm) |
|---|---|---|---|
| Original | 3.3 | 57.6 | 451 |
| Jet mill grinding 4 000 rpm | 2.9 | 12.7 | 35.5 |
| Air separation 10 000 rpm | 2.3 | 6.0 | 15.3 |
| Air separation 13 000 rpm | 1.8 | 4.6 | 9.2 |
| Air separation 18 000 rpm | 1.7 | 3.7 | 11.3 |
| Pearl mill grinding* | 2.1 | 8.6 | 30.1 |

*Feed: 13 000 rpm coarse fraction

| Oat starch (basic) | | | |
|---|---|---|---|
|  | $d_{10}$ (µm) | $d_{50}$ (µm) | $d_{90}$ (µm) |
| Original | 1.4 | 9.8 | 20.7 |
| Air separation 8 000 rpm | 1.7 | 7.2 | 15.3 |
| Air separation 10 000 rpm | 1.5 | 5.6 | 10.8 |
| Air separation 18 000 rpm | 2.1 | 5.9 | 17.2 |

EXAMPLE 16

Preparation of Pigment from Hydroxy Propyl Starch Ester

The procedure was the same as in example 1, but hydroxy propyl starch acetate was used as the starting material (Experiment 1) and propionate (Experiment 2). In both cases the resulting product was a white emulsion, the further processing of which was carried out according to example 1.

EXAMPLE 17

Brightness Properties and Opacity of Pigments

The brightness properties of pigments were determined by compressing sample buttons from the dried products, and measuring their ISO brightness. Table 2 shows the brightness results of the compressed tablets. Sample 250 TG 8-9 is starch acetate, from which the AP and AT type pigments are prepared.

TABLE 2

The brightness of the products, measured from compressed buttons.

| Sample data | Brightness |
| --- | --- |
| Example 4 product Without protective colloid | ISO br. 83.7 |
| Example 4 product PVA as protective colloid | ISO br. 83.8 |
| Example 8 | ISO br. 87.7 |
| Example 19, Experiment 4 | ISO br. 89.1 |
| Example 6 | ISO br. 94.4 |
| Potato starch | ISO br. 87.4 |

The brightness values of the prepared pigments are of a good standard compared with the ISO brightness values described in literature, of commonly used pigments:
Kaolin 80-90
GCC 87-97
Talc 85-90
PCC 96-99
Calcined kaolin 93
Titanium dioxide 97-99
Plastic pigment (polystyrene most commonly) 93-94
(Reference: Papermaking Science and Technology, book part 11, page 65)

The brightness and the opacity of coated papers and cardboards were studied, too. The coatings were made in a laboratory with K-Coater, onto 53.4 g/m² book grade paper.

Figure 13:
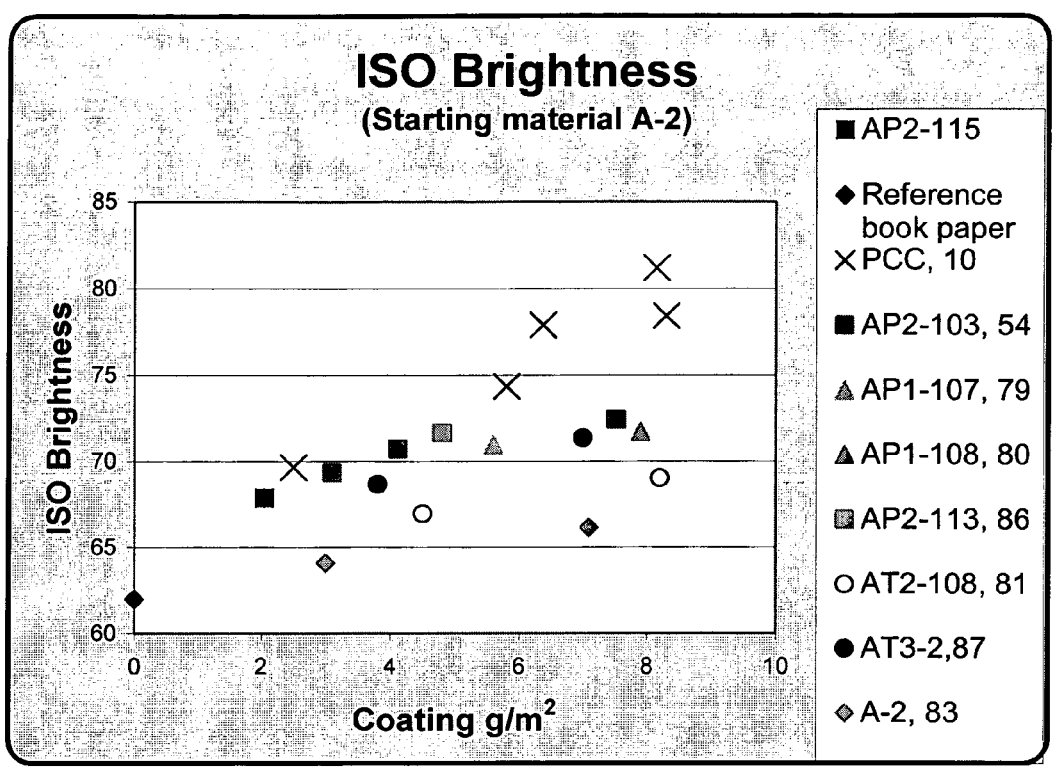
FIG. 13 shows the brightness values of the pigments, measured from the coatings, with the reference pigment being PCC.

FIG. 13 shows how the brightness of book grade paper increases as a function of the coat weight, using different test pigments, and using the filler PCC (FR-120, Huber) as a reference. At its best, the AP2 type pigment gives almost the same degree of brightness as does PCC having an equivalent coat weight and when the coat weights are small. With heavier coat weights the brightness of PCC is better. However, by improving the brightness of the product, and especially by making the particle size distribution narrower and pushing it nearer to the optimal size category of light scattering, the effect of the starch-based pigment can still be raised considerably.

Figure 14:
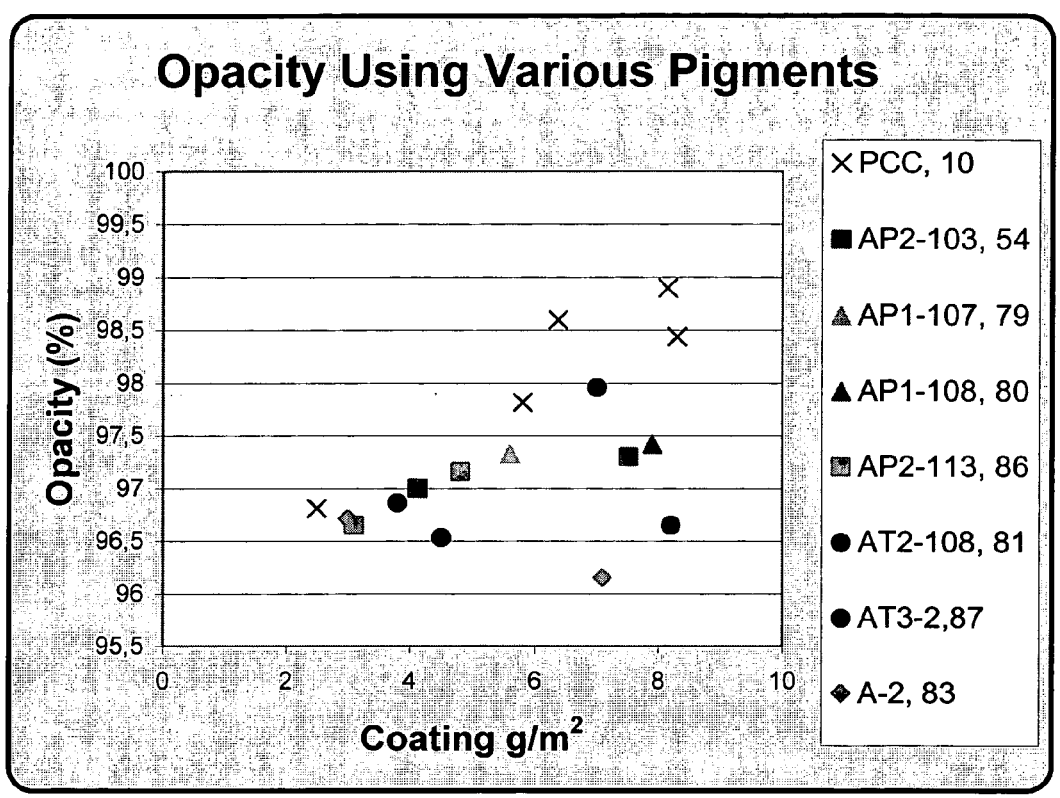
FIG. 14 shows, correspondingly, the opacity values of the pigments, measured from the coated papers, with the reference pigment being PCC.

FIG. 14 shows, correspondingly, the influence of the coat weight on the opacity of 53.4 g/m². To date, PCC remains the slightly better filler, and a better increase in the paper opacity is achieved with it than with starch pigment when using the same coat weight. According to calculations carried out at the University of Helsinki, by optimizing the particle size and by sufficiently narrowing the size distribution, the prepared starch-based test pigments can be made to be superior to the PCC filler, which was used as a reference, in light scattering efficiency and, consequently, these pigments are capable of improving the paper opacity more than does PCC having the same coat weight even though the refractive index of PCC is slightly higher than that of the prepared test pigments.

EXAMPLE 18

Web-Sizing Experiments with Pigments

The properties of pigments intended for filler purposes were tested by applying the test pigment and the reference PCC onto book grade paper using a web-sizing technique. This technique was used because with this method it is easy to establish the quantity of pigment applied to the paper. It is a fact that the quantity of starch pigments cannot, unlike the quantity of mineral pigments, be determined by incineration. Very different retention properties and the effects which the product differences have in the formation of sheets demonstrated that the web-sizing technique was the easiest way to carry out tests in the filler type applications of pigments.

The applications were carried out with a solid content of 10%, and therein 10% of latex was dosed.

Figure 15A:
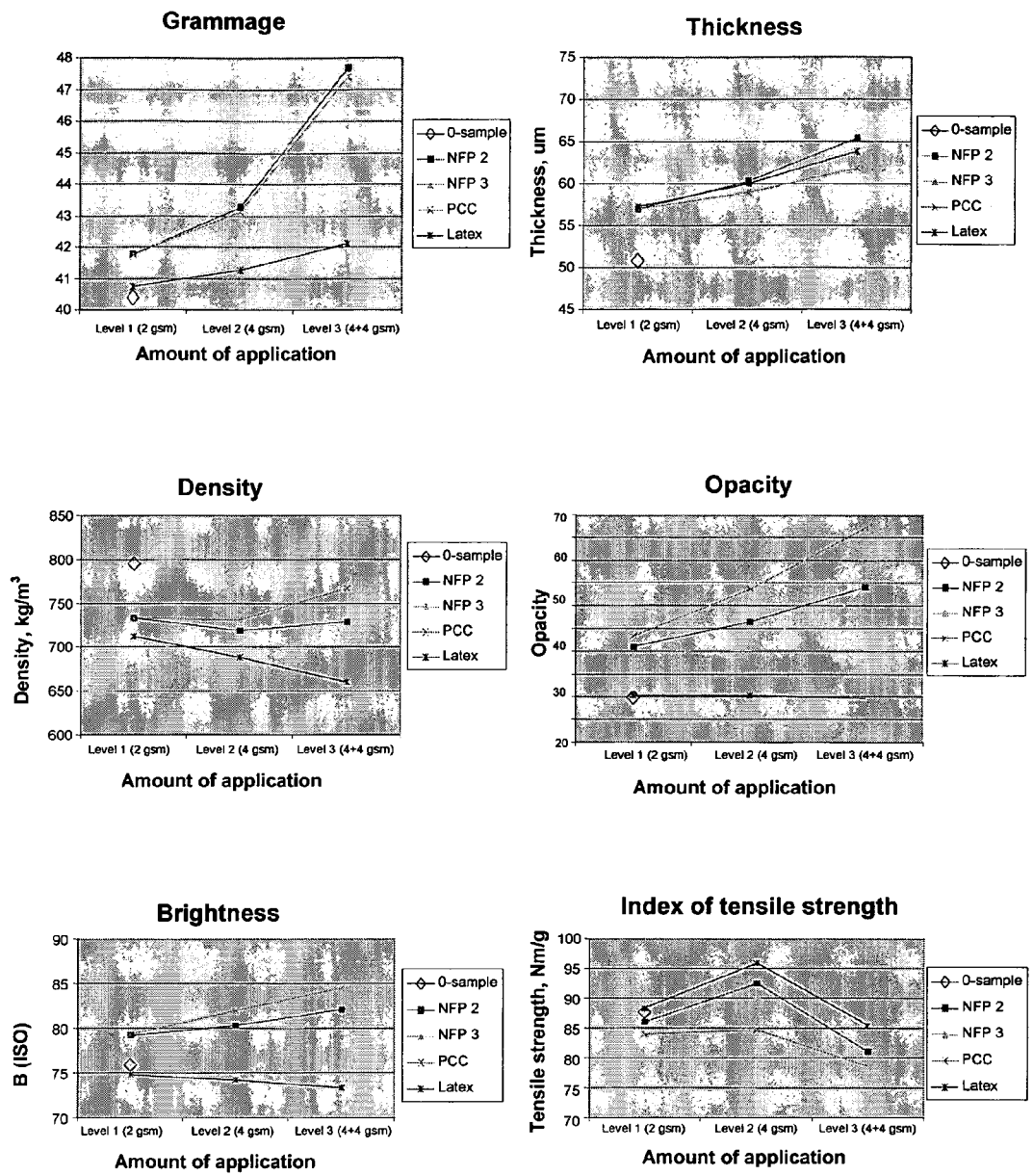
FIGS. 15a and 15b show the properties of the papers, pigmented with a surface-sizing technique, as a function of the quantity of coating paste applied.
Figure 15B:
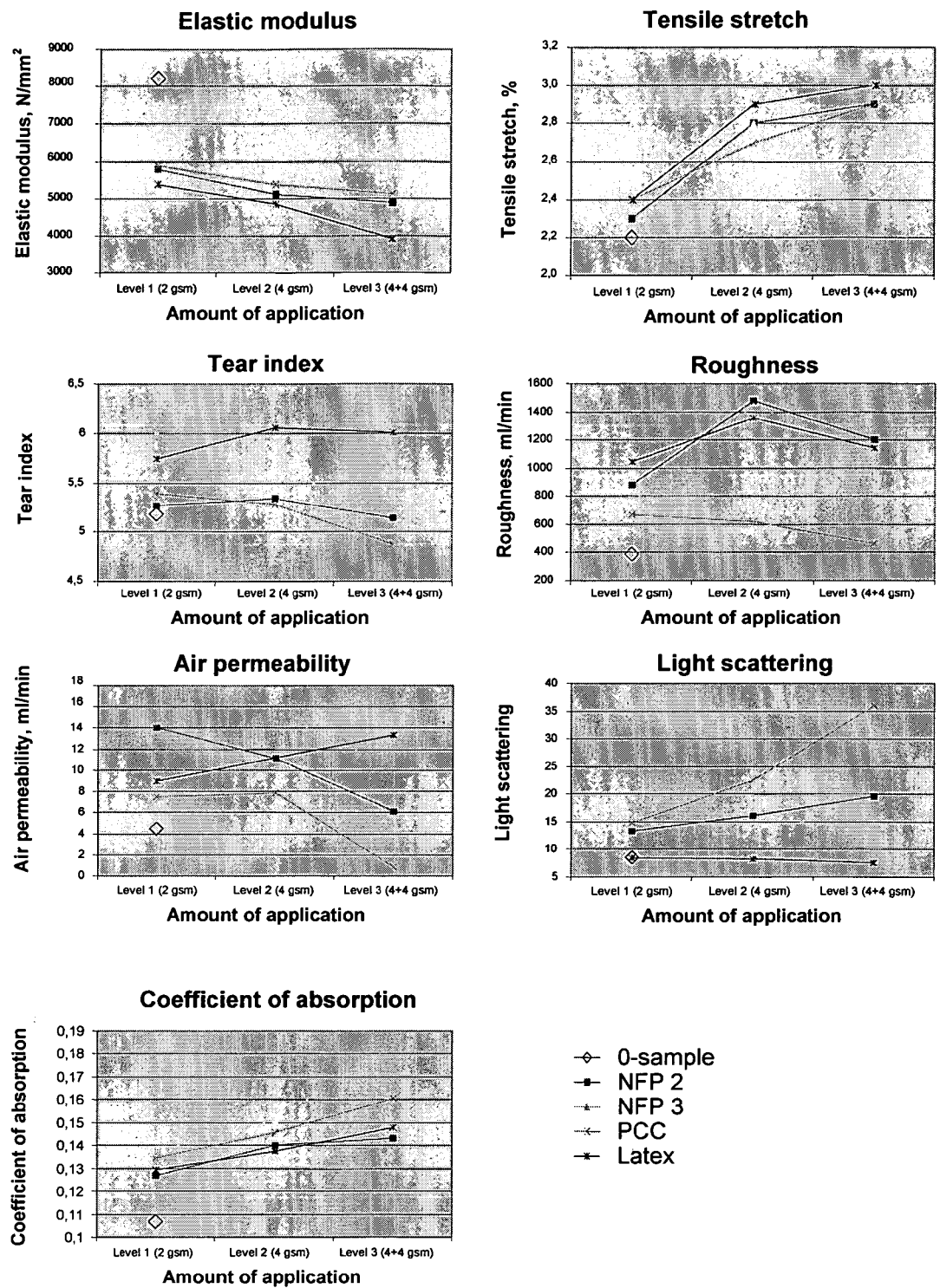

FIGS. 15a and 15b present the results of the web-sizing experiments. NFP 2 represents a pigment according to Example 2, and NFP 3 is a pigment prepared using a technique according to example 7.

The paper sheets have been driven through a surface-size press so many times that the grammage of the paper has increased to levels that correspond to the different quantities applied. At the test point 4+4 gsm, first, 4 grams have been applied to one side, and then another 4 grams onto the other. The latex point comprises the equivalent quantity of latex as the other test points, and the number of applications is equivalent to those of the NFP 2 test point (this means that latex is not dosed 2, 4 or 4+4 gsm).

From the result, it is seen that the general tendency is for the test points comprising starch pigment to have superior strengths to the test points comprising PCC. Because it is necessary to drive the paper through the surface-size press very many times to achieve the required quantities of application, the paper suffers and small wrinkles form easily, the paper swells and its strength decreases. On the other hand, the added latex increases the strength, but especially at the 4+4 level it is noticed that the strength starts to decrease, despite the effect of the latex. For a corresponding reason, the strength of the starch pigment, too, starts to decrease at the level 3 (4+4 gsm). Presumably, when the fillers are added directly into the pulp in paper-making, the improved strength properties of those papers with starch pigments are even more obvious, when compared with the use of PCC. This conclusion is based on the fact that when the webbing takes place and the hydrogen bonds are generated between the fibres, a large quantity of inorganic filler negatively interferes with the generation of these bonds, but the starch pigment does not disturb the generation of these bonds.

EXAMPLE 19

Preparation of Starch Derivatives Used in the Preparation of Pigments and Fillers Experiment 1. Preparation of Starch Acetate, According to Patent Application FI 107386.

The starch, the acetic acid (acetic acid:starch ratio 2), part of the acetic acid anhydride (calculated, based on the dry matter content of the starch and the water content of the other reagents, from the amount needed to achieve a degree of substitution of up to 1.7), and the catalyst (Na acetate, 7% of the starch quantity), were mixed and the blend was heated in a closed reactor, until the starch started to gelatinize.

The gelatinization starts an exothermal reaction, and the temperature of the reacting mixture rises rapidly. The temperature is held at 125° C. until the initial charge of the acetic acid anhydride has reacted. After that, the rest of the acetic anhydride is added (the quantity is calculated according to the desired DS of the end product), and the reaction is continued at 125° C. for 3.5 hours, counted from the gelatinization point.

After the esterification reaction, the reacting mixture was cooled to <100° C. and precipitated from a 2.5 times greater quantity of water. The precipitated product was filtered and washed with water until the pH value of the filtrate was >5: The product was dried with a vacuum contact dryer (Drais TurbuDry T250). The degree of substitution of the product was determined either with NMR, or by titrating the acetic acid, released in the alkali hydrolysis, from the starch acetate.

Depending on the acetic anhydride used, the DSs of the prepared products vary between 1.7 and 3.0, and the glass transition temperatures (Tg) between 155 and 162° C., according to the quality of the initial starch.

Experiment 2. Preparation of Starch Acetate from Hydrolyzed Starch.

The procedure was the same as in Experiment 1, but enzymatically or chemically hydrolyzed starch was used as the initial starch. As the degree of hydrolysis of the initial starch increases, the solubility of starch acetate in organic solvents increases, making it possible to increase the concentration in the preparation of pigments. The molecular weights of the initial starch affected the glass transition temperature of the products. When the molecular weight of the initial starch was Mw 537 000 g/mol, the Tg was 159° C., the degree of substitution being 3, and when the molecular weight was at the level of Mw 22 000 g/mol, the Tg was 134, with an equivalent degree of substitution.

Experiment 3. Preparation of Starch Acetate with a Drais TurbyDry T250 Reactor.

| Raw materials (in the form of dry matter) | |
| --- | --- |
| Native potato starch (Periva) | 33.0 kg |
| Acetic acid (technical 99%) | 49.5 kg |
| Sodium acetate (VTT 100%) | 2.5 kg |
| Acetic anhydride (technical 97%) | 115.5 kg |
| Water (from reagents) | 7.5 kg |

Preparation Process:
- Volumes of liquids according the formula are pumped into the reactor
- The dry materials are added from the filling unit
- The reactor is nitrified
- The reactor is heated to the temperature of 125° C., and cold water is kept in the jacket of the filter tower of the reactor
- The starch is gelatinized at approximately 115° C.
- The acetic acid-acetic anhydride mixture is refluxed, for a period of 5 hours starting from the gelatinization point
- When the reaction is finished, the product is precipitated from approximately 1000 kg of water
- The precipitate is washed and ground using a wet mill
- The ground product is filtered with a Larox vacuum drum filter and dried using a vacuum dryer
- During drying, the temperature range of the product is approximately 45 . . . 70° C.

The degree of substitution of the product is determined either by NMR, or by titrating the acetic acid, released in the alkali hydrolysis, from the starch acetate. The degree of substitution was found to be 2.2. The colour of the prepared potato starch acetate was bright. The ISO brightness of a starch acetate prepared in the same way with a smaller similar reactor was 88.

Experiment 4. Preparation of a Starch Acetate Based Pigment Raw Material with a Transglycosylation Reaction.

The preparation was carried out using methods according to the patent application FI 20020313 of VTT Technical Research Centre of Finland, either by batch reaction or by extrusion technology. The solubility of the transglycosylation product of starch acetate in organic solvents increases compared with native starch acetate. The ISO brightnesses of the products vary between 67 and 89, according to the efficiency of purifying and the initial starch.

The diol/polyol used in the transglycosylation reaction is bonded to the starch with an ether bond, and in the preparation of the pigment it affects the dispersibility of the product. The glass transition temperatures of the products were 155-157° C., while the degree of substitution varied between 2 and 2.5.

Experiment 5. Preparation of Hydroxypropyl Starch Acetate and Propionate

Preparation methods described in the FI patent applications 107930 and 107386 were used in the preparation of hydroxypropyl starch esters. In the preparation of propionate, the acetic acid was replaced with propionic acid, and the acetic anhydride with propionic acid anhydride.

EXAMPLE 20

The Influence of the Speed of Rotation and the Addition Rate on the Quantities and the Particle Size of the Product Fractions of Pigment Prepared with the Acetone-Ethanol Process A quantity of 120 g of starch acetate (Example 19, Experiment 4) was dissolved into a solvent blend which consisted of 1000 ml of ethanol, 400 ml of acetone and 400 ml of water. The resulting solution was divided into four equal parts, and 1250 ml of water was added to each one using the following addition times and speeds of rotation:

Experiment 1. Speed of rotation 300 rpm, addition time of water 6 sec

Experiment 2. Speed of rotation 300 rpm, addition time of water 3 min

Experiment 3. Speed of rotation 150 rpm, addition time of water 6 sec

Experiment 4. Speed of rotation 150 rpm, addition time of water 3 min

The pigment dispersion generated was further processed, as described in Example 2.

The coarser pigment fraction was separated by centrifuging, and the finer fraction was precipitated by addition of sodium sulphate. The washes were carried out according to Example 2.

The relative quantities of the fractions in the different experiments were as follows Experiment 1. The quantity of coarse fraction generated was four times the quantity of fine fraction Experiment 2. The quantity of coarse fraction generated was eleven times the quantity of fine fraction Experiment 3. The quantity of fine fraction was 93 times the quantity of coarse fraction Experiment 4. The quantity of fine fraction was nine times the quantity of coarse fraction.

The particle size of the coarse fraction was 300-1000 nm, and of the fine fraction<300 nm.

On the basis of the experiment, it is clearly seen that the preparation conditions affect the particle size distribution of the pigment.

The invention claimed is:

1. A method of manufacturing a starch-based pigment or filler comprising the steps of:
   dissolving a starch derivative having a glass transition point of 150° C. to 350° C. in a mixture of a solvent and water so that a solution comprising the starch derivative is formed;
   bringing the solution into contact with a non-solvent in which the starch derivative is not dissolved so as to precipitate the starch derivative from a liquid phase which is formed from the solvent, the water, and the non-solvent;

removing the solvent from the liquid phase; and separating the precipitate from the water and the non-solvent and recovering the precipitate to obtain the starch-based pigment or filler, wherein the solvent is ketone, the non-solvent is at least one non-solvent selected from the group consisting of water, $C_1$-$C_6$ alkanol and $C_4$-$C_{20}$ alkane, the solvent is used in a minimum amount to dissolve the starch derivative or in an amount of up to 30% by weight more than the minimum amount, a concentration of the starch derivative in the solution is 10-30% by weight, and an amount of the non-solvent used for precipitation is 0.5-10 tunes by weight of the amount of the solvent.

2. The method according to claim 1, wherein the solvent is used in a minimum amount to dissolve the starch derivative or in an amount of up to 20% by weight more than the minimum amount.

3. The method according to claim 1, wherein the viscosity of the solution is 1-5 times the viscosity of the water.

4. The method according to claim 1, wherein the starch derivative is not broken down at the temperature of 100° C.

5. The method according to claim 1, wherein the starch derivative is a starch ester.

6. The method according to claim 5, wherein the starch ester is an ester formed of starch and $C_{1-4}$ alkane acid.

7. The method according to claim 5, wherein the starch ester is a starch acetate.

8. The method according to claim 5, wherein the starch ester is transglycosylated or hydroxy alkylated.

9. The method according to claim 1, wherein a degree of substitution of ester groups of the starch derivatives is chosen in a way that the starch derivative is substantially insoluble in the non-solvent.

10. The method according to claim 1, wherein after the solvent is removed, the precipitate separated from the liquid phase does not contain such amount of solvent residues that the solvent can be detected with a 300 MHz NMR device.

11. The method according to claim 1, wherein the solvent can be completely mixed with the non-solvent.

12. The method according to claim 1, wherein the amount of the non-solvent is 0.7-5 times by weight of the amount of the solvent.

13. The method according to claim 1, wherein the non-solvent is added, while mixing, to the solution of the starch derivative so as to produce spherical pigment particles.

14. The method according to claim 13, wherein the spherical pigment particles have an average particle size of 90-1000 nanometers.

15. The method according to claim 13, wherein fine particles dispersed in the liquid phase are precipitated by salting out after the starch derivative is precipitated from the solution.

16. The method according to claim 1, wherein the solution is added, while mixing, to the non-solvent so as to produce a coral-like, porous pigment.

17. The method according to claim 16, wherein the pigment or filler has a particle size of 1-100 micrometres and pores having an average diameter of 100-500 nanometres.

18. The method according to claim 1, wherein the solution comprising the starch derivate is brought into contact with the non-solvent in a turbulent condition.

19. The method of claim 1, wherein the non-solvent comprises water.

20. The method of claim 1, wherein the non-solvent comprises a mixture comprising water and ethanol.

21. The method of claim 1, wherein the non-solvent comprises ethanol.

* * * * *